(12) United States Patent
Bristow et al.

(10) Patent No.: US 7,280,232 B2
(45) Date of Patent: Oct. 9, 2007

(54) METHOD AND APPARATUS FOR MEASURING WAFER THICKNESS

(75) Inventors: Thomas Bristow, Rochester, NY (US); Shu W. Wang, Rochester, NY (US)

(73) Assignee: Chapman Instruments, Inc., Rochester, NY (US)

( * ) Notice: Subject to any disclaimer, the term of this patent is extended or adjusted under 35 U.S.C. 154(b) by 478 days.

(21) Appl. No.: 10/946,450

(22) Filed: Sep. 21, 2004

(65) Prior Publication Data
US 2006/0061775 A1    Mar. 23, 2006

(51) Int. Cl.
*G01B 11/28* (2006.01)

(52) U.S. Cl. ..................................... 356/630

(58) Field of Classification Search ........ 356/600–603, 356/609, 614, 622–624, 630–637; 250/201.4, 250/559.27, 559.28
See application file for complete search history.

(56) References Cited

U.S. PATENT DOCUMENTS

| | | | | |
|---|---|---|---|---|
| 4,201,475 A | * | 5/1980 | Bodlaj | 356/631 |
| 4,564,296 A | * | 1/1986 | Oshida et al. | 356/630 |
| 4,879,706 A | * | 11/1989 | Lee | 369/44.23 |
| 4,910,453 A | * | 3/1990 | Abbe et al. | 324/663 |
| 5,351,126 A | * | 9/1994 | Takada et al. | 356/602 |
| 5,696,589 A | * | 12/1997 | Bernacki | 356/630 |
| 6,111,649 A | * | 8/2000 | Tominaga et al. | 356/630 |
| 7,119,351 B2 | * | 10/2006 | Woelki | 250/559.4 |

* cited by examiner

*Primary Examiner*—Sang H. Nguyen
(74) *Attorney, Agent, or Firm*—Neal L. Slifkin; Robert C. Brown

(57) ABSTRACT

A system for non-contact measurement of thickness of an object. A laser beam is split into two identical input beams that are directly opposed. A calibration object of known thickness causes beams to be reflected from sides of the test object. Each reflected beam passes through auto-focus means including a quad sensor coupled to focusing means on the input beam, causing each input beam to be focused on the calibration object, thereby defining first and second focal points a known distance apart. The focus is locked and focus error data are generated for each beam. The calibration object is removed, and the test object is inserted into the path of the focused input beams, creating focus error signals for the reflected beams. By determining the deviation of the positions of the test object reflecting surfaces from the positions of the calibration object surfaces, the test object thickness can be readily and accurately determined.

11 Claims, 4 Drawing Sheets

METHOD AND APPARATUS FOR MEASURING WAFER THICKNESS

TECHNICAL FIELD

The present invention relates to means for measuring thickness of objects; more particularly, to method and apparatus for non-contact measurement of thickness; and most particularly, to method and apparatus for non-contact measuring the thickness of a planar object such as a silicon wafer or a flat panel display.

BACKGROUND OF THE INVENTION

Silicon wafers are important elements of the semiconductor industry. Such wafers typically are sawn from artificially-grown silicon crystals and require one or more surface finishing or conditioning operations, each of which causes progressive thinning of a wafer.

The semiconductor industry is moving toward thinner wafers, especially important for smart cards, flash memory, and other products requiring thin packaging. One of the challenges for thin wafer manufacturing is uniformity of thickness after backgrind. A system is needed for acccurate measurement of wafer thickness, preferably a non-contact system. Such a system may also be useful for measuring thickness of other semiconductor elements such as bare silicon wafers, flat panel displays, and MEMS.

A wafer starts at a thickness of approximately 0.8 mm and provides the building block for all of the processing leading to a wide range of electronic memory products. A finished wafer moves to a "backend" facility, which may be another plant in a different country. In the so-called backend segment of the semiconductor industry, the wafer goes through a back-grinding process wherein material is removed from the wafer backside by grinding the back surface. Currently, the wafer thickness after backgrinding is typically between about 0.1 mm and about 0.3 mm, depending upon the final application.

The factory segment of the industry consists of thinning, dicing, and packaging chips cut from the wafer.

There are at least two prior art methods and apparatus for non-contact measurement of thickness after backgrind of a finished wafer.

Systems employing capacitative sensors, for example, are available from ADE Technologies, Inc. (Westwood, Mass.) and Mechanical Technologies, Inc. (Albany, N.Y.). This technology has been used in measuring thickness of bare and patterned wafers. A known problem in applying this technology to wafers having chips formed on their surfaces is that the capacitative sensor can be confused by the signal from the chip and the wafer due to metal and/or other materials in the chip. Also, the capacitative technique can be influenced by a protective tape used to protect the wafer front surface.

Systems employing an optical type measurement are available from Frontier Semiconductor Measurements, Inc. (San Jose, Calif.). Their system relies on measuring the angular reflection from top and bottom (after transmission through the part) surfaces. A known problem with this technology is that the spatial resolution can be relatively low, leading to confusion and overlap between a chip and another nearby feature on the wafer.

What is needed in the art is a non-contact means for measuring the thickness of a test object, and especially of a chip-bearing silicon wafer after backgrind, wherein the thickness measurement is highly accurate, wherein spatial resolution along the surface of the object is very high, and wherein the means is not affected by metallic or non-silicon components of a wafer.

It is a principal object of the present invention to provide high-resolution, high-accuracy thickness measurement of a test object.

SUMMARY OF THE INVENTION

Briefly described, a system in accordance with the invention for non-contact measurement of thickness of a test object employs a generator for creating a light beam, preferably a laser beam. The beam is split into two identical input beams and directed conventionally by mirrors and beam splitters such that the two input beams are directly opposed, defining a test space for receiving an object to be measured. A calibration object of known thickness, for example, an optical flat, when inserted into the test space causes first and second reflected beams to be reflected from first and second sides of the calibration object. The thickness of the calibration object should approximate the thickness of a test object to be subsequently measured. Each reflected beam is diverted through a conventional auto-focus means comprising an astigmatic lens assembly and a quad CCD sensor coupled to focussing means on the input beam, causing each input beam to be focussed on the test object, thereby defining first and second focal points in space. The focal points are a known distance apart, as dictated by the known thickness of the calibration object.

The focus is locked and the calibration object is moved to a plurality of new locations along the input beams on either side of the focal points, thereby generating a plurality of positive and negative focus error signals for each beam which may be plotted against location to yield a focus error characteristic curve for each beam. The output may be provided as a look-up table, a graph, or preferably is stored in a computer for use with an appropriate algorithm. The calibration object is removed, and the system is ready for measurement of the thickness of an object such as a silicon wafer.

The test object is inserted into the path of the input beams, creating thereby first and second focus error signals for the first and second reflected beams. By comparing the focus error signals to the characteristic curves and determining the deviation of the positions of the test object reflecting surfaces from the positions of the calibration object surfaces, the test object thickness between the reflecting surfaces can be readily and accurately determined.

An important advantage of the present system is that a very small focused spot may be used, on the order of about 1 µm. When means are provided to translate the test object orthogonal to the beams, the wafer thickness can be readily measured to a very high degree of resolution in the presence of surface features. This can be very useful, for example, in characterizing so-called "bump wafers" which have small bumps all over the wafer for interconnect. This is a relatively new concept and is being used at present by some advanced fabricators. The bumps presently have diameters and spacings on the order of 100 µm, and the industry goal will be to reduce both. It is important to know what the base thickness of the wafer is in between the bumps. Prior art systems having relatively large optical focus spots are not suitable for bump wafer analysis. However, a system in accordance with the invention can scan across a wafer and can readily determine the base thickness of the wafer between the bumps.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
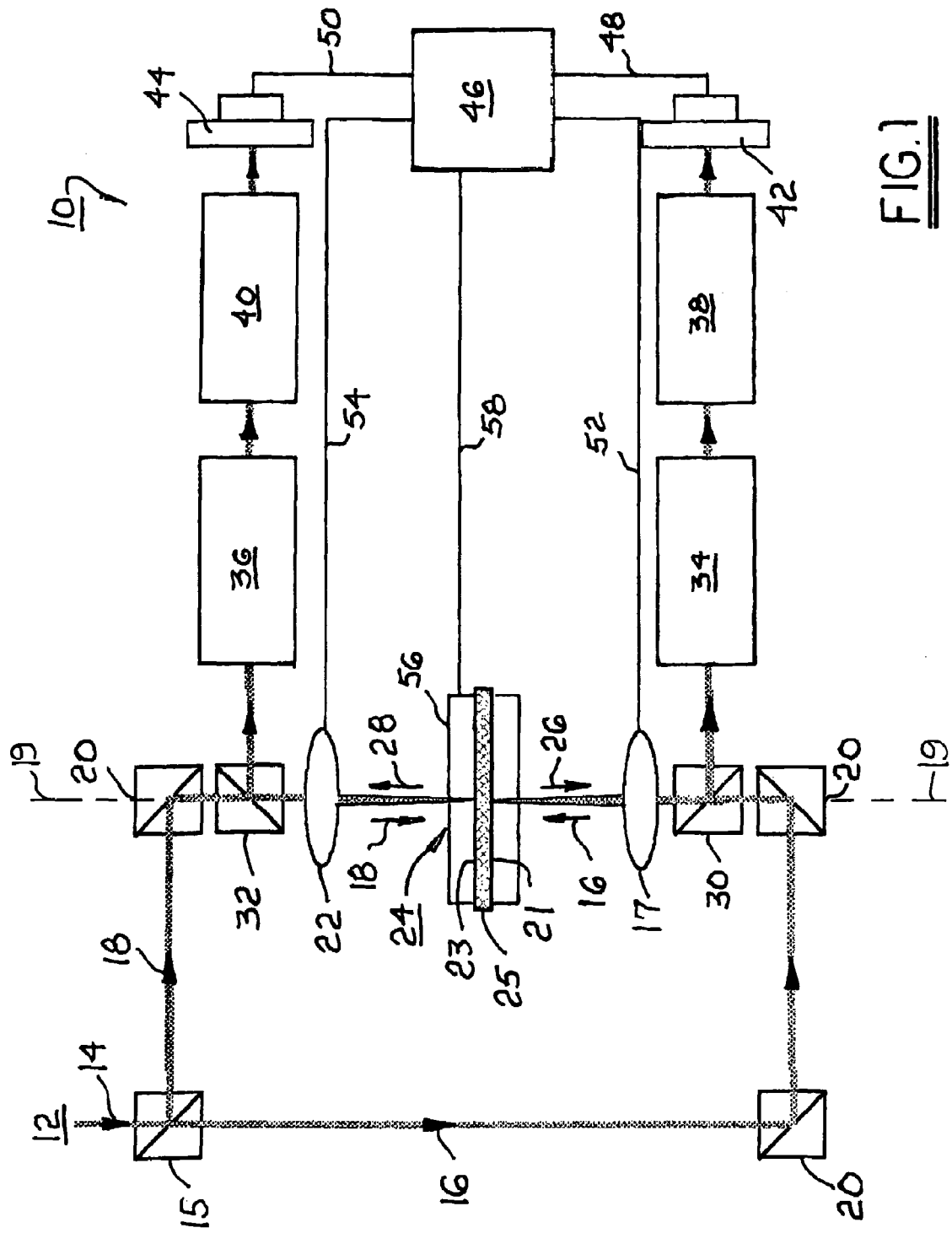
FIG. 1 is a schematic drawing showing a system in accordance with the invention for measuring thickness of an object.

Referring to FIG. 1, a non-contact thickness measurement system 10 in accordance with the invention includes a light-generating source 12 capable of producing a master beam 14. Beam 14 may be incoherent but preferably is a laser beam. A first beam splitter 15 divides master beam 14 into first and second input beams 16,18 which preferably are substantially identical in intensity. Angled mirrors 20 turn beams 16,18 such that they are in opposition along an optic axis 19. First and second focussing means 17,22 are provided for focussing input beams 16,18 independently in a space 24 between focussing means 17 and 22. When reflective surfaces 21,23 of an object 25 are placed in space 24, first and second reflective beams 26,28 from surfaces 21,23 are turned by half-mirrors 30,32, respectively, to direct reflective beams 26,28 through first and second lens 34,36, first and second astigmatic systems 38,40, and onto first and second quad cells 42,44, respectively. Optionally, a laser light discriminator (not shown) may also be included ahead of each quad cell in known fashion. A programmable control means 46, preferably a computer, including a selectively deactivatable autofocus algorithm, receives input signals 48,50 from quad cells 42,44 indicative of the focus state of input beams 16,18 with respect to surfaces 21,23. Control means 46 sends output signals 52,54 to focussing means 17,22 to adjust the focus thereof until a null signal is produced in quad cells 42,44. Preferably, a conventional multi-axis stage 56 is provided in space 24 for mounting of object 25 and positioning object 25 in response to signals 58 from control means 46.

Figure 3:
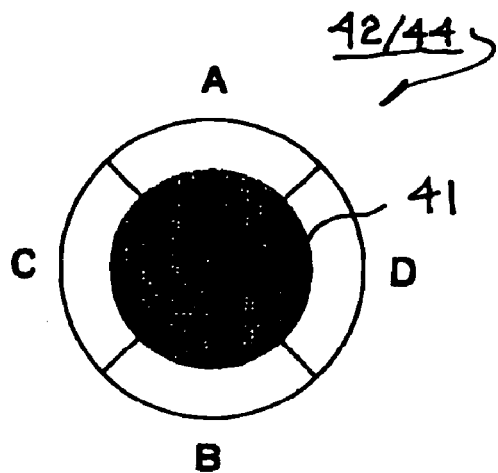
FIG. 3 is a schematic drawing of a quad sensor when an input beam of the system shown in FIG. 1 is in focus on a surface of the object.
Figure 4:
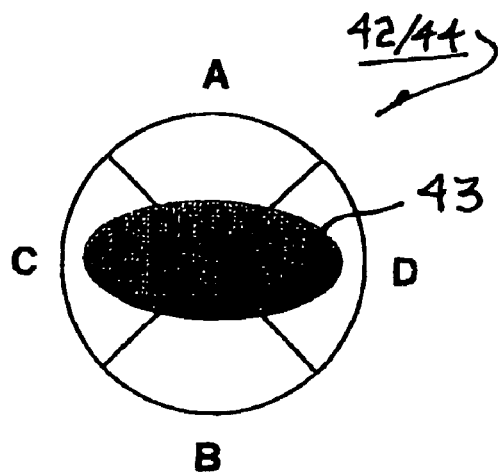
FIG. 4 is a drawing like that shown in FIG. 3, showing a C-D direction elliptical reflected beam when the focal point of the input beam is above the surface of the object.
Figure 5:
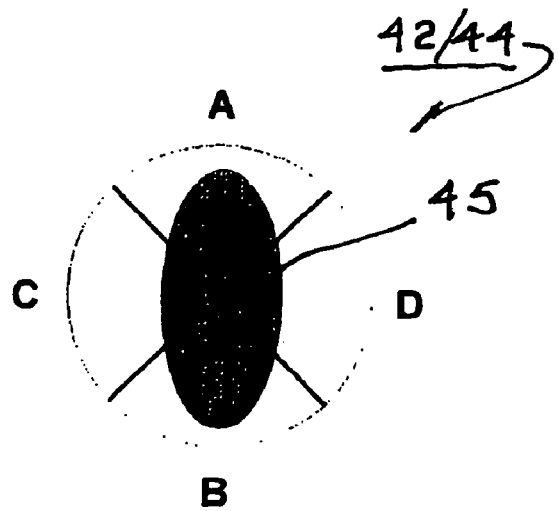
FIG. 5 is a drawing like that shown in FIG. 3, showing a A-B direction elliptical reflected beam when the focal point of the input beam is below the surface of the object.

Referring to FIGS. 3 through 5, a conventional quad cell (42 or 44), as is known in the art, includes four phototransistor sensor quadrants, identified for convenience as A, B, C, and D. In system 10, the lens combinations 34,36 and astigmatic systems 38,40, as is known in the art, convert reflected circular beams 26 into astigmatic beams. When the input beam is in focus on a surface, the reflected beam impinging on the quad cell shows substantially no astigmatism and is circular (41), as shown in FIG. 3. Because each quadrant produces an equal voltage output, there is a null balance among the quadrants, and the focus error signal is zero. When the focal point is behind the reflective surface (i.e., within the object), the reflected beam assumes an oval shape (43) elongated in the C-D direction (FIG. 4) providing a greater signal from C and D quadrants than from A and B quadrants. Likewise, when the focal point is above the reflective surface (i.e., outside the object), the reflected beam assumes an oval shape (45) elongated in the A-B direction (FIG. 5) providing a greater signal from A and B quadrants than from C and D quadrants.

A net focus error signal (FES) is defined by the following algorithm, in terms of strength of quadrant signal:

$$FES=[(A+B)-(C+D)]/[A+B+C+D] \qquad (Eq.\ 1)$$

It will be seen that when A+B>C+D, the FES is positive, and when A+B<C+D, the FES is negative.

Figure 2:
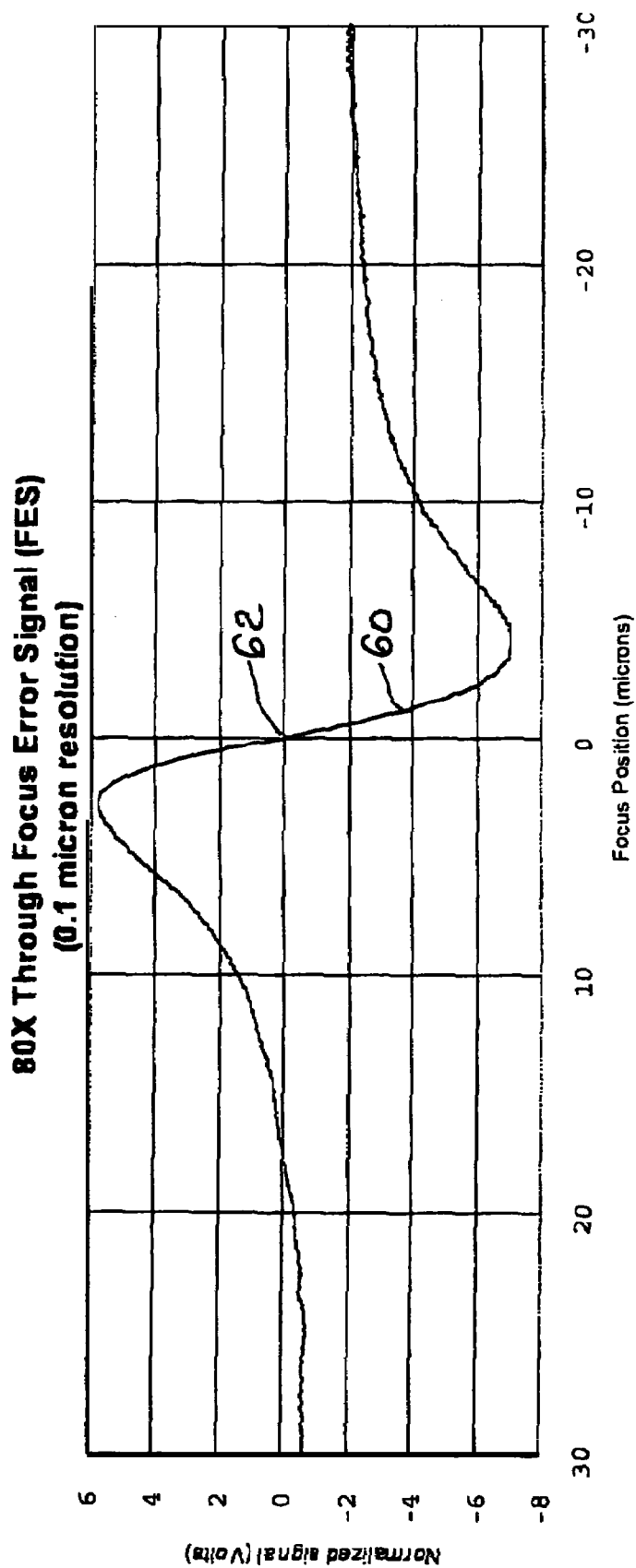
FIG. 2 is a graph of focus error signal as a function of distance from focus for use in a method in accordance with the invention.

The FES as a function of distance in both directions from a focal spot may be readily plotted by fixing the focus and then moving the reflective surface along optic axis 19 to a plurality of locations on either side of the focal spot. Referring to FIG. 2, a plot of FES is shown (curve 60) as a function of distance in μm from the focus position 62 at which the FES from a quad cell is zero (A+B)=(C+D). When using an 80× objective (curve 60), a distance resolution of about 0.1 μm can be obtained with system 10.

Figure 6:
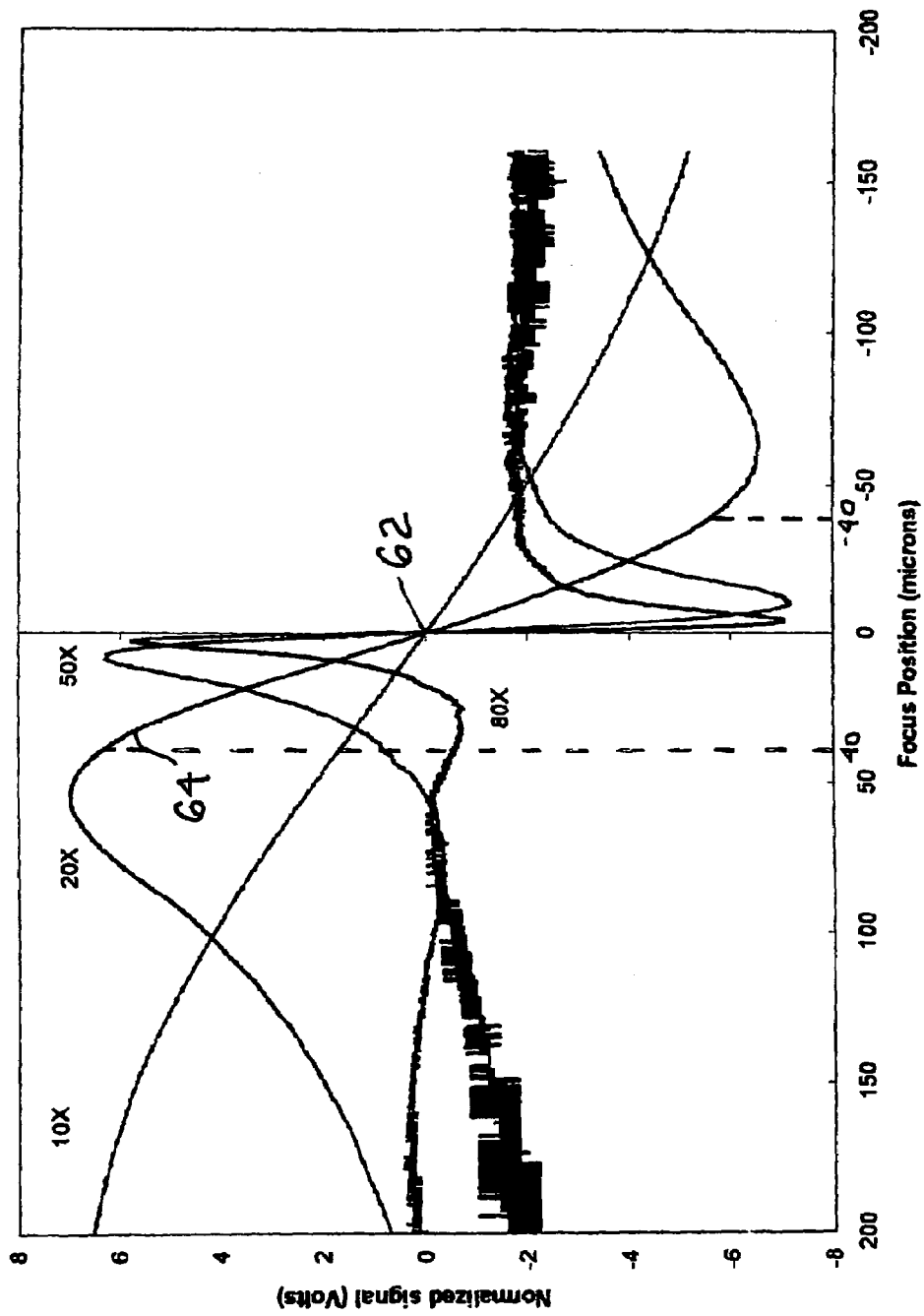
FIG. 6 is a plurality of curves like that shown in FIG. 2, taken at various objective powers of the system optics.

FES curves for this and other other objective magnifications are shown in FIG. 6. Note the change in position scale (x-axis) between FIGS. 2 and 6. In a currently preferred embodiment for characterizing back-ground silicon wafers, a 20× objective is used, providing a linear useful range of the 20× curve (64) of about +/−40 μm from focal point 62 with a distance resolution of about 0.1 μm.

In a method in accordance with the invention for determining the thickness of a test object, system 10 is first calibrated. A calibration object 25 is positioned as shown in FIG. 1. The calibration object is preferably a reference flat having plane parallel reflective surfaces 21,23. The thickness of the calibration object is selected to approximate the estimated thickness of the test object. The objective power in focussing means 17,22 is also selected, based in part upon the topographic range to be measured in the test object and in part upon the accuracy required, as discussed above.

The autofocus means in system 10 senses the degree of focus in quad cells 42,44 and adjusts focussing means 17,22 until a null signal is received from the quad cells. Input beams 16,18 are now in focus on surfaces 21,23, respectively at first and second focal spots separated by a distance equal to the thickness of the calibration object, for example, 100 μm. The autofocus is then disabled, such that input beams remain in fixed focus on the first and second focal spots in space.

Stage 56 is now moved along optic axis 19, in response to signals 58 from control means 46 to stage 56, to a plurality of locations on either side of the focal spots, as described above, thereby generating a plurality of focus error measurements as a function of the distance of each of the locations from the null location. These measurements preferably are stored in memory in control means 46 for later access. Stage 56 and calibration object 25 are returned to the focus null position, and the calibration object is removed.

To measure the thickness of a test object, the test object is installed on stage 25 and positioned such that areas of surfaces 21,23 predetermined for measurement are positioned for impingement of input beams 16,18. Because the focus of each beam 16,18 is now fixed, each quad cell 42,44 generates a focus error signal directly indicative of the distance, either positive or negative, of each surface 21,23 from the fixed focal points on optic axis 19. The distances may be determined by referring to the calibration data previously stored in control means 46. The distances are added to (positive distances) or subtracted from (negative distances) the calibration distance between the focal points, representing the thickness of the calibration object. Thus, the thickness of the test object is obtained.

System 10 is especially useful in characterizing the thickness of objects of varying thickness, for example, a "bump" wafer having a gross wafer thickness at the peak of each bump and a net wafer thickness in the valleys between the bumps. Wafer 25 may be moved by control means 46 along a programmed path orthogonal to optic axis 19. Because the size of each focal spot is small relative to the topography, the peak wafer thickness and valley wafer thickness may be readily determined.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for measuring the thickness of an object having first and second surfaces, comprising the steps of:
   a) providing first and second opposed light beams;
   b) providing first and second focus error determining means for said first and second opposed light beams;
   c) focusing said first and second opposed light beams at first and second focal points in space;
   d) determining the distance between said first and second focal points in space to provide a reference thickness;
   e) inserting said object into said first and second opposed light beams such that said beams impinge on said first and second surfaces, respectively;
   f) determining first and second net focus error signals from reflections of said first and second beams from said first and second surfaces, respectively; and
   g) applying said first and second net focus error signals to said reference thickness to obtain said thickness of said object between said first and second surfaces,
   wherein at least one of said first and second focus error determining means includes a photo cell having four phototransistor sensor quadrants,
   wherein a net focus error signal (FES) for said photo cell is defined in terms of strength of respective quadrant signals A, B, C, and D by the algorithm FES=[(A+B)−(C+D)]/[A+B+C+D].

2. A method in accordance with claim 1 wherein said first and second light beams are laser light beams.

3. A method in accordance with claim 1 wherein said object is selected from the group consisting of silicon wafer, flat panel display, and MEMS.

4. A method in accordance with claim 1 wherein said step of focusing said first and second opposed light beams at first and second focal points in space and said step of determining the distance between said first and second focal points in space to provide said reference thickness comprise the steps of:
   a) inserting a calibration object having a known thickness between first and second calibration surfaces thereof into said first and second beams; and
   b) focusing said first and second beams onto said first and second calibration surfaces to define said first and second focal points in space, the space therebetween being defined by said known thickness of said calibration object (reference thickness).

5. A method in accordance with claim 4 comprising the further steps of:
   a) disabling auto-focus means for each of said first and second beams;
   b) moving said calibration object to a plurality of new positions along said first and second beams in both directions from said focal points in space; and
   c) recording focus error measurements for said first and second beams at each of said new positions.

6. A method in accordance with claim 5 comprising the further step of plotting said focus error measurements for said first and second beams as a function of position along said beams to generate a focus error characteristic curve for each of said beams.

7. A method in accordance with claim 1 wherein means for determining said first and second focus error signals includes astigmatic optics.

8. A method in accordance with claim 7 wherein said first and second surfaces are substantially orthogonal to said first and second light beams.

9. A system for measuring thickness of an object having first and second surfaces, comprising:
   a) means for generating first and second opposed light beams for impinging on said first and second surfaces, respectively;
   b) means for selectively focusing each of said first and second light beams;
   c) means for determining a net focus error signal for each of said first and second light beams as reflected from said first and second surfaces, respectively; and
   d) computational means for processing said first and second focus error signals to determine object thickness,
   wherein at least one of said means for determining includes a photo cell having four phototransistor sensor quadrants, and
   wherein a net focus error signal (FES) for said photo cell is defined in terms of strength of respective quadrant signals A, B, C, and D by the algorithm FES=[(A+B)−(C+D)]/[A+B+C+D], and
   wherein said computational means includes a computer having an algorithm for determining the locations of said first and second surfaces along said first and second beams as a function of said first and second net focus error signals, and for applying said net focus error signals to a reference distance between two reference points along said beams to determine said object thickness.

10. An apparatus in accordance with claim 9 wherein said first and second light beams are laser light beams.

11. An apparatus in accordance with claim 9 wherein said means for determining said first and second net focus error signals includes astigmatic optics.

* * * * *